(12) United States Patent
Hannen

(10) Patent No.: US 7,281,917 B2
(45) Date of Patent: Oct. 16, 2007

(54) EXTRUSION/REACTION INJECTION MOLDING SYSTEM

(75) Inventor: Timothy J. Hannen, Colts Neck, NJ (US)

(73) Assignee: Patwin Plastics, Inc., Linden, NJ (US)

( * ) Notice: Subject to any disclaimer, the term of this patent is extended or adjusted under 35 U.S.C. 154(b) by 95 days.

(21) Appl. No.: 11/000,171

(22) Filed: Dec. 1, 2004

(65) Prior Publication Data

US 2006/0113692 A1    Jun. 1, 2006

(51) Int. Cl.
B29C 44/46    (2006.01)
B29C 47/30    (2006.01)

(52) U.S. Cl. ............... 425/133.5; 425/4 C; 425/131.1; 425/817 C

(58) Field of Classification Search .......... 425/131.1, 425/132, 133.1, 133.5, 4 R, 4 C, 817 R, 425/817 C
See application file for complete search history.

(56) References Cited

U.S. PATENT DOCUMENTS

| | | | | |
|---|---|---|---|---|
| 2,806,249 A | * | 9/1957 | Craig | 425/71 |
| 3,246,366 A | * | 4/1966 | Taylor et al. | 425/104 |
| 3,901,958 A | * | 8/1975 | Doll | 264/45.5 |
| 4,056,344 A | * | 11/1977 | Lemelson | 425/132 |
| 4,149,839 A | * | 4/1979 | Iwawaki et al. | 425/133.1 |
| 4,318,764 A | * | 3/1982 | VanManen | 156/244.11 |
| 4,364,882 A | * | 12/1982 | Doucet | 264/45.9 |
| 4,383,812 A | * | 5/1983 | Calcagni | 425/133.1 |
| 4,816,313 A | | 3/1989 | Hosokawa et al. | |
| 4,911,628 A | * | 3/1990 | Heilmayr et al. | 425/131.1 |
| 4,997,707 A | | 3/1991 | Otawa et al. | |
| 5,126,088 A | * | 6/1992 | Andres | 264/173.17 |
| 5,336,463 A | | 8/1994 | Hara et al. | |
| 5,445,208 A | | 8/1995 | Shaner et al. | |
| 5,571,581 A | | 11/1996 | Koizumi et al. | |
| 5,658,603 A | | 8/1997 | Andersen et al. | |
| 5,660,016 A | | 8/1997 | Erwin et al. | |
| 5,665,284 A | | 9/1997 | Erwin et al. | |
| 5,695,789 A | * | 12/1997 | Harris | 425/131.1 |
| 5,713,165 A | | 2/1998 | Erwin | |
| 5,969,047 A | | 10/1999 | Ngoc et al. | |
| 6,280,671 B1 | * | 8/2001 | Benz et al. | 264/172.14 |
| 6,328,550 B1 | * | 12/2001 | Sheen et al. | 425/133.1 |
| 6,497,947 B1 | | 12/2002 | Blais et al. | |
| 2002/0167103 A1 | * | 11/2002 | Ickinger | 264/40.3 |
| 2002/0187217 A1 | | 12/2002 | McDonald et al. | |
| 2003/0082254 A1 | * | 5/2003 | Shorey | 425/133.1 |
| 2003/0087081 A1 | | 5/2003 | Seiling et al. | |
| 2003/0175488 A1 | | 9/2003 | Asthana et al. | |
| 2005/0067729 A1 | * | 3/2005 | Laver et al. | 264/45.9 |
| 2005/0191378 A1 | * | 9/2005 | Brenyer | 425/133.1 |
| 2005/0271761 A1 | * | 12/2005 | Ohki et al. | 425/133.5 |
| 2006/0029775 A1 | * | 2/2006 | MacKinnon et al. | 428/141 |

* cited by examiner

Primary Examiner—Tim Heitbrink
Assistant Examiner—Emmanuel S Luk
(74) Attorney, Agent, or Firm—Oblon, Spivak, McClelland, Maier & Neustadt, P.C.

(57) ABSTRACT

A method of manufacturing an extruded part having an exterior shell and a core foam material. The method includes extruding the exterior shell from an extrusion die, and reaction injection molding the core foam material within an interior of the exterior shell using a distribution block having a plurality of orifices configured to inject the core foam material within the interior of the exterior shell. The orifices are configured to evenly distribute the core foam material throughout the interior of the exterior shell. the method can be used to form an exterior shell having a plurality of internal chambers, where the orifices of the distribution block are configured to inject core foam material within the plurality of internal chambers.

19 Claims, 5 Drawing Sheets

EXTRUSION/REACTION INJECTION MOLDING SYSTEM

BACKGROUND OF THE INVENTION

1. Field of the Invention

The present invention relates to the field of plastic extruded parts.

2. Discussion of the Background

Since it's introduction nearly thirty years ago, the use of polyurethane products has increased dramatically. The use of these products by builders and homeowners alike has increased because of their advantages over wood and other building materials. Their resistance to chemicals, water (including salt water exposure) and insects has made them valuable products to homes and buildings.

These products are produced using a reaction injection molding (RIM) system where two components are combined under high pressure in a mixing head and poured or shot into a mold. The mold can be made from various materials such as silicone, wood or aluminum.

Some disadvantages of this manufacturing system are they are time consuming and costly. The products are produced in a "one at a time" process. The polyurethane shot into the mold and must cure before it is removed. Once cured it is removed from the mold and the back is machined flat. The molding must also be painted or coated as part of the finishing process.

The demand by consumers for products with better performance that require less maintenance has led to new approaches in manufacturing.

The new invention accommodates these needs by a more efficient manufacturing process, which yields parts that demonstrate better characteristics.

SUMMARY OF THE INVENTION

The present invention combines a polyurethane reactive injection molding (RIM) process with an extrusion process in a manner that provides the ability to produce high volume parts at an economical rate.

The invention relates to a combined extrusion and reaction injection molding system and method which combines the benefits of the two types of processes. More specifically, the invention combines extrusion technology with reaction injection molding (RIM) technology to produce articles that have, for example, a rigid polyvinylchloride (PVC) exterior shell and a firm, lightweight polyurethane (PUR) inner core.

The present invention advantageously provides a method of manufacturing an extruded part having an exterior shell and a core foam material, and an extruded part that is formed using such a method. The method includes extruding the exterior shell from an extrusion die, and reaction injection molding the core foam material within an interior of the exterior shell using a distribution block having a plurality of orifices configured to inject the core foam material within the interior of the exterior shell.

The plurality of orifices is preferably configured to evenly distribute the core foam material throughout the interior of the exterior shell. The step of extruding the exterior shell can be used to produce an exterior shell having a plurality of internal chambers, where the orifices of the distribution block are configured to inject core foam material within the plurality of internal chambers. The method of the present invention can allow for the provision of a single set of sizing and cooling sleeves that are utilized to cool the exterior shell and the core foam material.

The present invention further advantageously provides a method of manufacturing an extruded part including extruding an exterior shell from an extrusion die, and reaction injection molding a core foam material within an interior of the exterior shell, where the exterior shell exits the extrusion die at a same location along an extrusion process line as the core foam material exits from the distribution block. The present invention also provides an extruded part that is formed using such a method.

The present invention also advantageously provides a system for manufacturing an extruded part. The system includes an extruder configured to heat and/or mix a first material, a mixing head configured to supply a core foam material, and an extrusion die configured to receive the first material from the extruder, where the extrusion die has an outlet configured to discharge an exterior shell made of the first material. The system also includes a distribution block provided within the extrusion die. The distribution block has an inlet configured to receive the core foam material from the mixing head, and a plurality of outlet orifices configured to inject the core foam material within an interior of the exterior shell.

The system of the present invention preferably includes a mounting plate configured to mount the mixing head to the extrusion die. The system also preferably includes a calibration unit configured to receive the core foam material and the exterior shell simultaneously from the distribution block and the extrusion die, respectively, where the calibration unit is configured to cool and shape the core foam material and the exterior shell. The system further preferably includes a puller configured to convey the core foam material and the exterior shell at a constant rate, and a cutting device configured to cut the core foam material and the exterior shell to a predetermined length.

The present invention further advantageously provides an extruded part comprising an exterior shell having a plurality of internal chambers, and a core foam material provided within each of the plurality of internal chambers.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

in FIG. 2;

in FIG. 2;

DETAILED DESCRIPTION OF THE INVENTION

Figure 1:
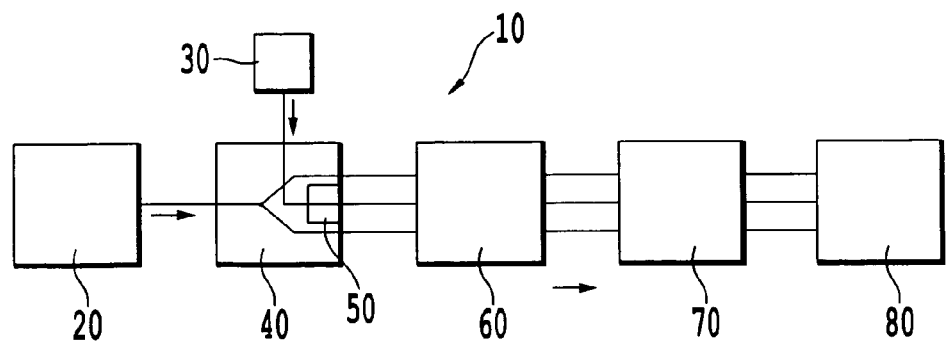
FIG. 1 is a schematic representation of a system for manufacturing an extruded part according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

As mentioned above, the present invention relates to a combined extrusion and reaction injection molding system and method which combines the benefits of the two types of molding processes. More specifically, the invention combines extrusion molding technology with reaction injection molding (RIM) technology to produce molded articles that heave, for example, a rigid polyvinylchloride (PVC) exterior shell and a firm, lightweight polyurethane (PUR) inner core.

A known benefit of polyurethane is the high strength to weight ratio of the material. Polyurethane is also desirable because of its ability to duplicate parts, such as wood moldings and plaster moldings. However, conventional polyurethane RIM processes are generally used for the production of one molded article at a time.

Extrusion processes for molding or extruding PVC material articles advantageously allow for continuous extrusion. However, such processes include the drawback that the process becomes very slow when producing large PVC foam parts.

By using a customized RIM mixing head, the combined extrusion and RIM process of the present invention allows for the filling of a hollow extruded PVC shell with a firm, lightweight polyurethane inner core. Articles thus formed by the invention provide for the combination of a hard weatherable outer skin of PVC, and a lightweight polyurethane PUR material core. An added benefit of the process of the invention results from the fact that as the shell and core cool, the inner core of polyurethane foam continues to expand inside the outer hollow PVC shell which shrinks, thus forming a void-free, compact structure. The invention further provides the added benefit of greater weight reduction when used with a PUR foam core, since the PUR is foamable to a lighter lb/ft. number than PVC foam.

FIG. 1 provides a schematic representation of a system 10 for manufacturing an extruded part 90 according to an embodiment of the present invention. The embodiment utilizes an extrusion process in which an extruder 20 is used to heat and/or mix material used to form an exterior shell 92 of the extruded part 90. The extruder 20 continuously conveys a controlled amount of material to an extrusion die 40 through an inlet 42 in the die 40 (see FIGS. 3 and 4). The extruder 20, through an internal auger, meters and pumps plastic pellets or powder through a barrel which is heated to provide a melted thermoplastic material, which can then pass through the die 40. The extruder 20 is fed by a hopper or loading system which can be capable of providing other additives such as color, blowing agents, or fillers. It is possible the loader can also deliver a pre-set amount of material timed to the extruder output to control the output weight of the final extruded part.

The extrusion die 40 can take on different forms. A conventional die, as is depicted herein, is an "in-line die," since the die is considered to be in-line with the extruder 20 and the extrusion line. The die 40 is attached to the extruder 20 by a clamp or is bolted to the extruder. Alternatively, other types of extrusion dies can be used with the present invention. For example, a cross-head die can be utilized, where the extruder is at a right angle to the extrusion die.

The present invention utilizes a mixing head 30 that is used to continuously supply a controlled amount of material for injecting as a core foam material 94. A specially constructed mounting plate 38 is employed to attach an injection gun 34 of the mixing head 30 to an internal distribution block 50, which is provided within a recess in the extrusion die 40. The mixing head 30 is fluidly connected to the injection gun 34 by one or more hoses 32. The material supplied to the injection gun 34 travels through an opening 39 in the mounting plate 38, to the inner channels 54 of the distribution block 50.

The internal distribution block 50 includes plural outlet orifices 52 for equal distribution of the foam core material 94 throughout an interior of the exterior shell 92. The internal distribution block 50 can be formed to have any desirable configuration of outlet orifices, which allows for the foam filling of various thicknesses and complex parts (such as windows/door profiles) by internal channeling through the internal distribution block. The distribution block 50 and the extrusion die 40 will be discussed in more detail below.

A calibration unit 60 is placed directly after the extrusion die 40 and the distribution block 50 (i.e., directly downstream of the extrusion die 40 and distribution block 50 in the extrusion process line). Note that the calibration unit 60 is depicted in FIG. 1 as being spaced apart from the extrusion die 40 and the distribution block 50, however the extrudate preferably exits the extrusion die 40 and the distribution block 50 directly into the calibration unit 60. The calibration unit 60 is used to help cool and maintain the final shape of the extrudate. The calibration unit 60 can be of varying length depending on the output rate of the extruder 20. The calibration unit 60 generally has a series of vacuum and water connections that are attached to calibrators, as is known to one of ordinary skill in the art. The calibration units help shape, cool, and maintain the final dimensions of the extrudate.

After the calibration unit 60, a puller 70 is provided in the extrusion process line to convey the extrudate at a constant rate from the calibration unit 60 to a cutting device or other finishing device 80. The puller 70 can have continuous rubber tracks or rubber belts that are in contact with the outer surface of the extrudate. The product is conveyed by the puller 70 to the cutting device 80, which can be a saw, knife, or other cutting means, used to cut the traveling extrusion part to a predetermined length.

Figure 2:
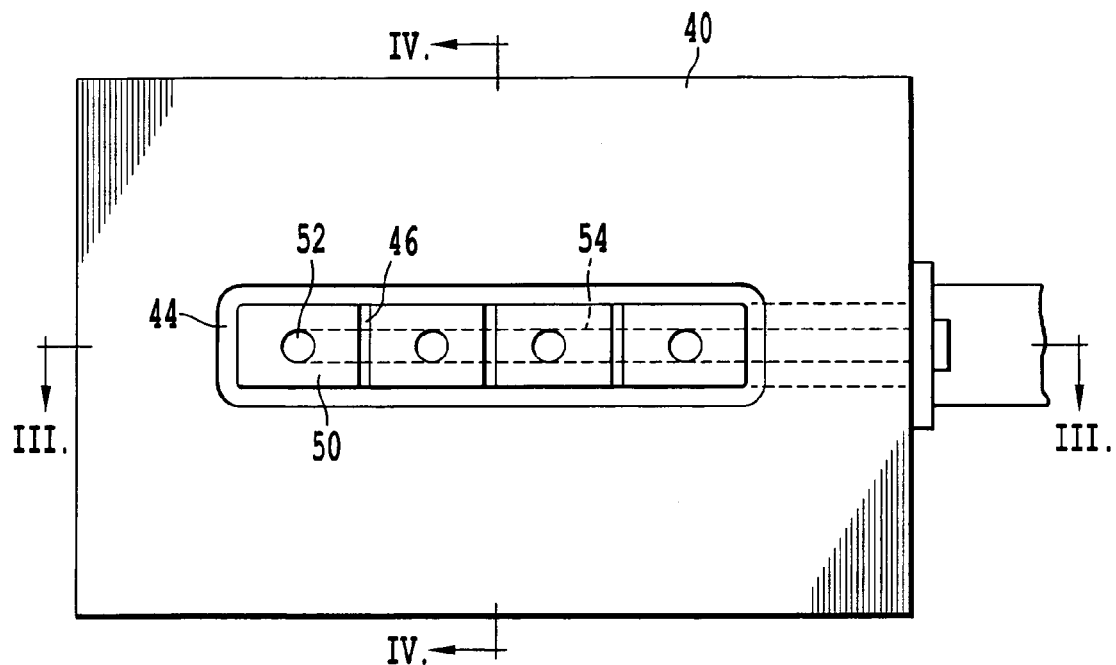
FIG. 2 is an end view of an extrusion die and distribution block according to an embodiment of the present invention.
Figure 3:
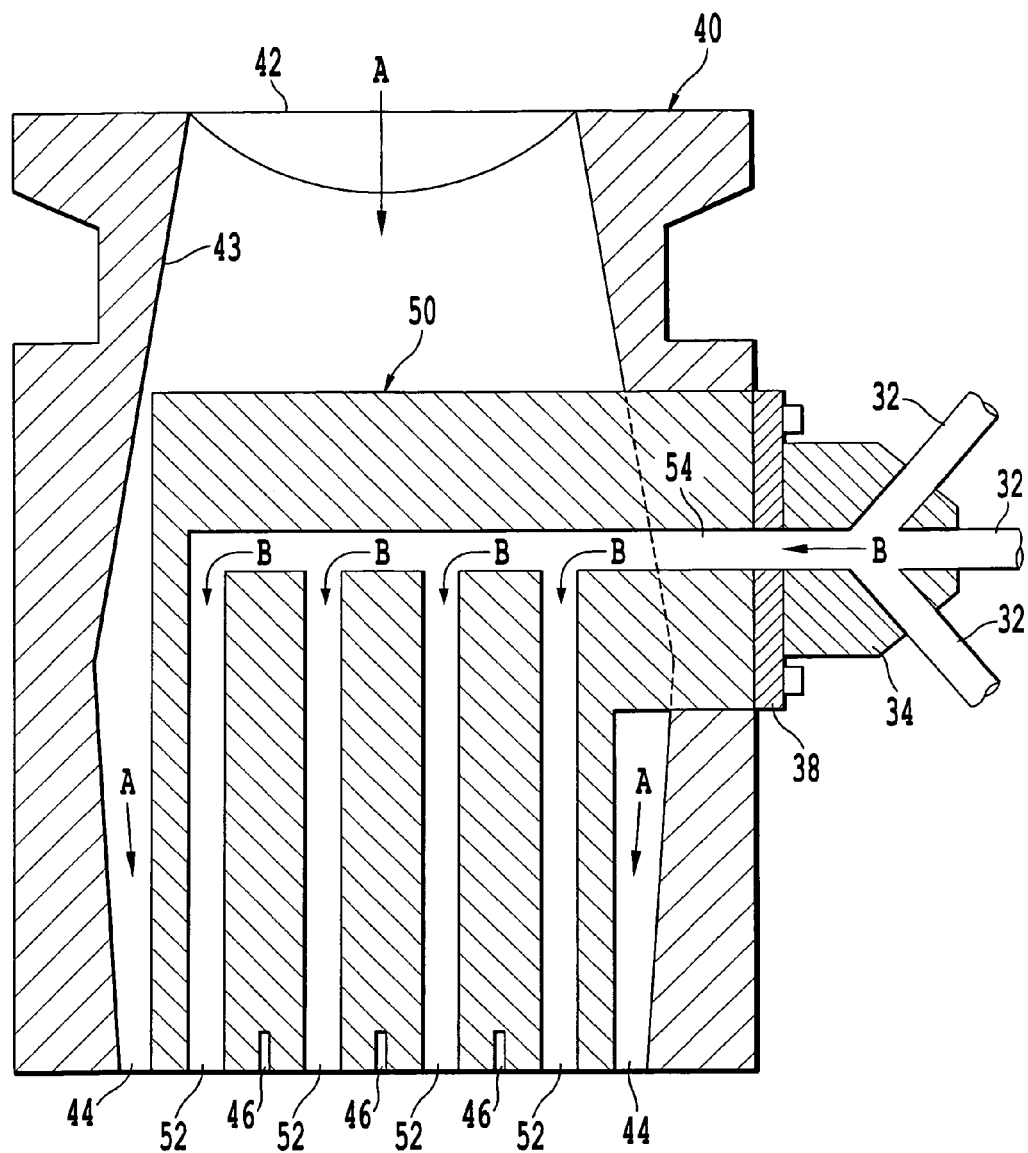
FIG. 3 is a cross-sectional view of the extrusion die and distribution block taken along line III.-III.
Figure 4:
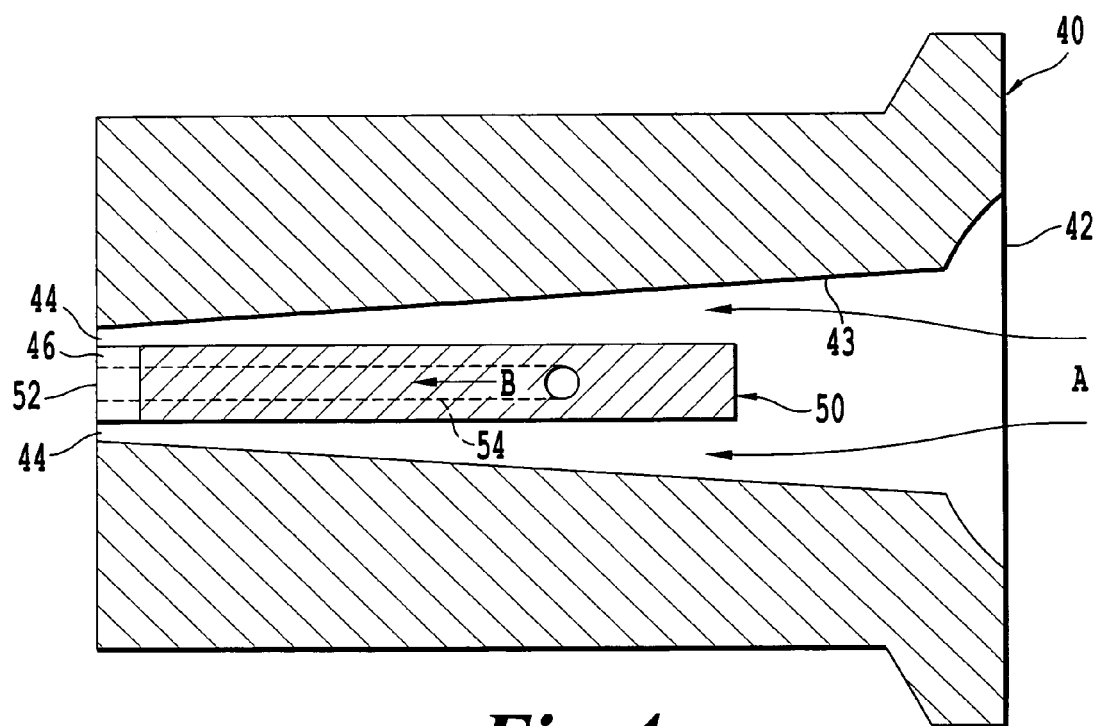
FIG. 4 is a cross-sectional view of the extrusion die and distribution block taken along line IV.-IV.
Figure 5:
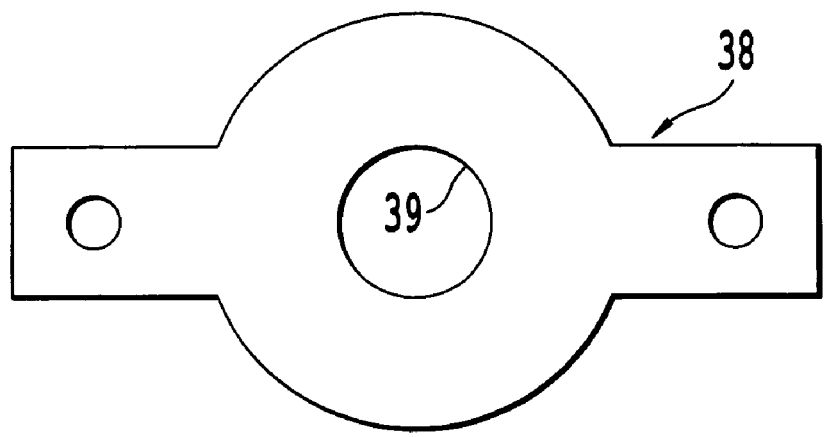
FIG. 5 is a plan view of a mounting plate for mounting a mixing head to the extrusion die according to an embodiment of the invention.
Figure 6:
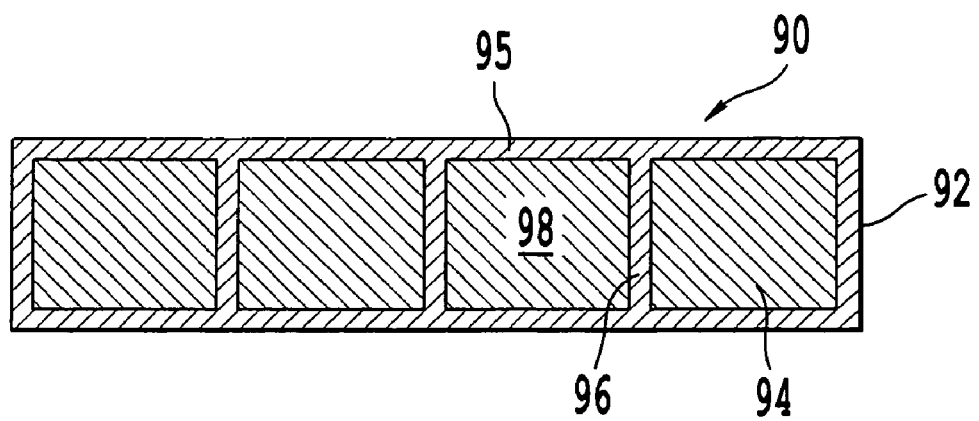
FIG. 6 is an end view of an extruded part according to an embodiment of the present invention.

The embodiment of extrusion die 40 and internal distribution block 50 depicted in FIGS. 2-4 are configured to produce an extruded part 90, which is depicted in FIG. 6. The extruded part 90 includes an exterior shell 92 with a foam core material 94 provided in an interior thereof. The exterior shell 92 preferably includes an outer portion 95 and one or more internal legs 96 that divide the shell 92 into various internal chambers 98 that are filled with the foam core material 94. However, it should be noted that exterior shell 92 can be formed without the internal legs 96 if so desired. Furthermore, it should be noted that the extruded part can be formed in a variety of different shapes by providing a variety of different configurations of extrusion dies 40 and distribution blocks 50. The present invention advantageously provides a system in which varied and complex shapes of extruded parts can be formed, since the distribution block 50 is configured to provide a plurality of orifices 52 are configured to evenly distribute the core foam material throughout the interior of the exterior shell, regardless of how complex the shape of the exterior shell.

The extrusion die 40 depicted in FIGS. 2-4 is configured to receive a controlled amount of fluid material from the extruder 20 through an inlet 42 in the die 40. The extrusion die 40 has an interior chamber 43 that channels the fluid material from the inlet 42 to an outlet 44. The fluid material travels around the exterior of the distribution block 50, as depicted by the arrows A. FIG. 2 depicts the outlet 44 of the extrusion die 40 as a narrow opening extending around the outer surface of the distribution block 50, which forms the outer portion 95 of the exterior shell 92. As depicted in the figures, the distribution block 50 is provided with slots 46 in between the orifices 52. The slots 46 allow fluid material from flow A to flow therein in order to form the internal legs 96 of the exterior shell.

The configuration of the extrusion die 40 including the interior chamber 43 can be modified such that the extrusion die 40 includes a portion that covers the outer surface of the distribution block 50, such that the fluid flow A does not directly contact the outer surface of the distribution block 50. It will be readily apparent to one of ordinary skill in the art based upon the teaching provided herein that the configuration of the extrusion die and distribution block, and the channels provided within these components, can be modified to product a wide variety of shapes and sizes of extruded parts. For example, the extrusion die can be formed with segmented channels as is known in the art, instead of the interior chamber depicted. The segmented channels can be formed in the extrusion die to direct the flow of fluid material around the distribution block to the outlet 42, or to segmented outlets that generally form the shape of the exterior shell.

The distribution block 50 is provided with inner channels 54 that transport the fluid flow B from the opening 39 in the mounting plate 38 to the outlet orifices 52. The present invention allows for advantageous thermo bonding between the exterior shell 92 and the foam core material 94, since both exit at the same time. The exterior shell 92 exits the extrusion die 40 at a location directly adjacent to a location where the core foam material 94 exits the plurality of orifices 52. The exterior shell 92 and the core foam material 94 are simultaneously injected into the calibration unit 60 from the extrusion die 40 and the distribution block 50, respectively, and the exterior shell 92 exits the extrusion die 40 at a same location along an extrusion process line as the core foam material 94 exits the distribution block 50.

Another benefit of the present invention is that only a single set of sizing and cooling sleeves necessary to cool the exterior shell 92 and the core foam material 94. The exterior shell 92 and the core foam material 94 are held at a substantially uniform temperature as they travel through the extrusion die 40 and the distribution block 50, respectively, without the use of a cooling means therein. Then, a single set of sizing and cooling sleeves are provided downstream of the outlet of the extrusion die 40 and the plurality of outlet orifices 52 of the distribution block 50 in the calibration unit 60, thereby simplifying the process.

Figure 7:
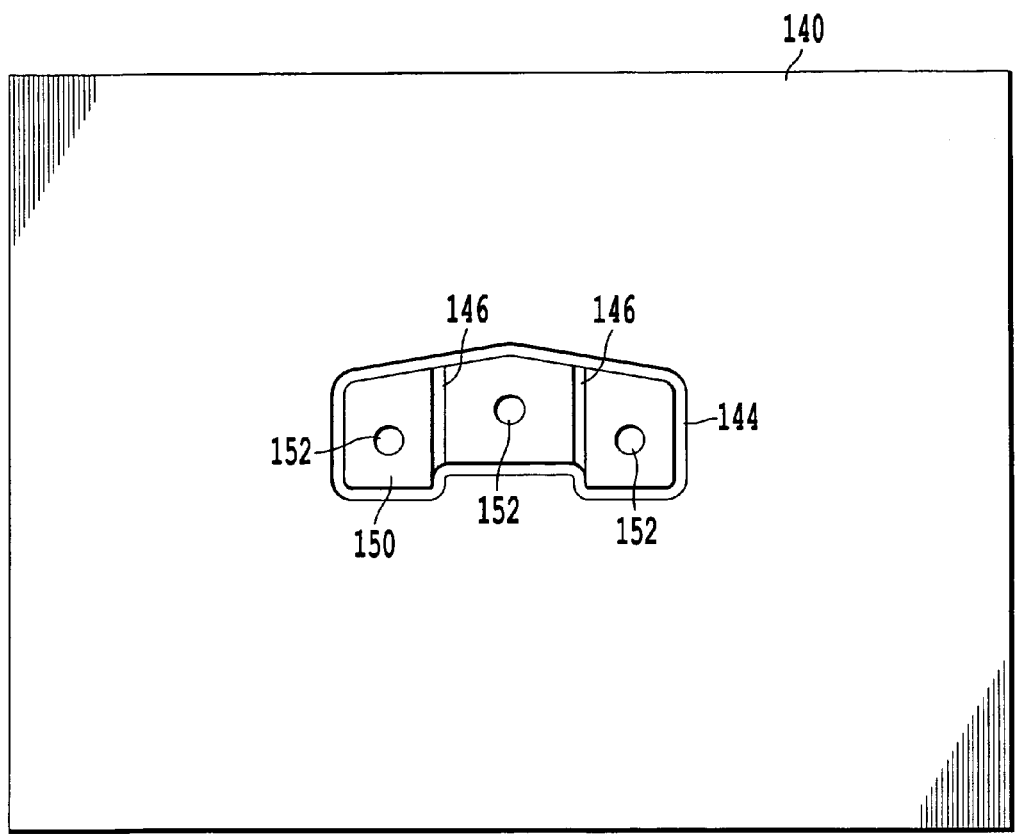
FIG. 7 is an end view of an extrusion die and distribution block according to an alternative embodiment of the present invention.

FIG. 7 is an end view of an extrusion die and distribution block according to an alternative embodiment of the present invention. The alternative embodiment is configured to produce an extruded part can having a different shape than that of FIG. 6. In the alternative embodiment an extrusion die 140 and a distribution block 150 are provided. The distribution block 150 includes a plurality of orifices 152 that are configured to evenly distribute the core foam material throughout the interior of the exterior shell.

The extrusion die 140 depicted in FIG. 7 is configured to receive a controlled amount of fluid material from the extruder. The extrusion die 140 has an interior chamber that channels the fluid material from the inlet thereof to an outlet 144. FIG. 7 depicts the outlet 144 of the extrusion die 140 as a narrow opening extending around the outer surface of the distribution block 150, which forms the outer portion of the exterior shell. As depicted in FIG. 7, the distribution block 150 is provided with slots 146 in between the orifices 152. The slots 146 allow fluid material from the extruder to flow therein in order to form the internal legs of the exterior shell.

The present invention advantageously provides a method that utilizes the direct attachment of a PUR mixing head to an extrusion die by a specialized mounting plate. The present invention provides the ability to fill a variety of parts having various thickness, shapes and sizes, which can have internal legs or walls, by using an internal distribution block. The distribution block can take on many forms to conform to the extrusion die and the desired extruded part. Through internal channeling in the distribution block, complex shapes such as windows, fence and siding profiles can be evenly filled.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention can be practiced otherwise than as specifically described herein.

What is claimed as new and desired to be secured by Letters Patent of the United States is:

1. A system for manufacturing an extruded part, said system comprising:
   an extruder configured to heat and/or mix a first material;
   a mixing head configured to supply a core foam material;
   an extrusion die configured to receive the first material from the extruder, the extrusion die having an outlet configured to discharge an exterior shell made of the first material; and
   a distribution block provided within the extrusion die, the distribution block having an inlet configured to receive the core foam material from the mixing head, the distribution block having a plurality of outlet orifices configured to inject the core foam material within an interior of the exterior shell,
   wherein the outlet of the extrusion die is a uniform opening extending around an entire outer perimeter of the distribution block, and
   wherein the distribution block includes at least one slot provided on an outlet face thereof configured to receive and discharge the first material.

2. The system according to claim 1, further comprising a mounting plate configured to mount the mixing head to the extrusion die.

3. The system according to claim 1, further comprising:
   a calibration unit configured to receive the core foam material and the exterior shell simultaneously from the distribution block and the extrusion die, respectively, the calibration unit being configured to cool and shape the core foam material and the exterior shell;
   a puller configured to convey the core foam material and the exterior shell at a constant rate; and
   a cutting device configured to cut the core foam material and the exterior shell to a predetermined length.

4. The system according to claim 1, wherein the plurality of outlet orifices are configured to evenly distribute the core foam material throughout the interior of the exterior shell.

5. The system according to claim 1, wherein the extrusion die includes channels configured to produce an exterior shell having a plurality of internal chambers.

6. The system according to claim 5, wherein the plurality of outlet orifices of the distribution block are configured to inject core foam material within the plurality of internal chambers.

7. The system according to claim 1, wherein the exterior shell exits the outlet of the extrusion die at a location directly adjacent to a location where the core foam material exits the plurality of outlet orifices.

8. The system according to claim 1, wherein the exterior shell and the core foam material are simultaneously injected into a calibration unit from the extrusion die and the distribution block, respectively.

9. The system according to claim 1, wherein the exterior shell exits the outlet of the extrusion die at a same location along an extrusion process line as the core foam material exits from the plurality of outlet orifices of the distribution block.

10. The system according to claim 9, wherein a single set of sizing and cooling sleeves are utilized to cool the exterior shell and the core foam material, and wherein the single set of sizing and cooling sleeves are provided downstream of the outlet of the extrusion die and the plurality of outlet orifices of the distribution block.

11. The system according to claim 1, wherein a single set of sizing and cooling sleeves are utilized to cool the exterior shell and the core foam material.

12. The system according to claim 1, wherein the outlet of the extrusion die is flush with the plurality of outlet orifices of the distribution block.

13. The system according to claim 1, wherein the at least one slot extends from one side of the outer perimeter to another side of the outer perimeter.

14. A system for manufacturing an extruded part, said system comprising:
   an extruder configured to heat and/or mix a first material;
   a mixing head configured to supply a core foam material;
   an extrusion die configured to receive the first material from the extruder, the extrusion die having an outlet configured to discharge an exterior shell made of the first material; and
   a distribution block provided within the extrusion die, the distribution block having an inlet configured to receive the core foam material from the mixing head, the distribution block having a plurality of outlet orifices configured to inject the core foam material within an interior of the exterior shell,
   wherein the outlet of the extrusion die is an opening extending around an outer perimeter of the distribution block, and
   wherein the distribution block includes at least one slot provided on an outlet face thereof configured to receive and discharge the first material.

15. The system according to claim 14, wherein the outlet of the extrusion die is flush with the plurality of outlet orifices of the distribution block.

16. The system according to claim 14, wherein the at least one slot extends from one side of the outer perimeter to another side of the outer perimeter.

17. The system according to claim 14, further comprising a mounting plate configured to mount the mixing head to the extrusion die.

18. The system according to claim 14, further comprising:
   a calibration unit configured to receive the core foam material and the exterior shell simultaneously from the distribution block and the extrusion die, respectively, the calibration unit being configured to cool and shape the core foam material and the exterior shell;
   a puller configured to convey the core foam material and the exterior shell at a constant rate; and
   a cuffing device configured to cut the core foam material and the exterior shell to a predetermined length.

19. The system according to claim 14, wherein a single set of sizing and cooling sleeves are utilized to cool the exterior shell and the core foam material, and wherein the single set of sizing and cooling sleeves are provided downstream of the outlet of the extrusion die and the plurality of outlet orifices of the distribution block.

* * * * *